(12) United States Patent
Kim et al.

(10) Patent No.: US 11,703,109 B2
(45) Date of Patent: Jul. 18, 2023

(54) PLANETARY GEAR ACTUATOR

(71) Applicants: NAVER LABS CORPORATION, Seongnam-si (KR); Korea University of Technology and Education Industry-University Cooperation Foundation, Cheonan-si (KR)

(72) Inventors: Yong Jae Kim, Cheonan-si (KR); Seong Ho Yun, Goyang-si (KR); Ji Won Seo, Seoul (KR)

(73) Assignees: NAVER LABS CORPORATION, Gyeonggi-do (KR); Korea University of Technology and Education Inductry-University Cooperation Foundation, Chungcheongnam-Do (KR)

( * ) Notice: Subject to any disclaimer, the term of this patent is extended or adjusted under 35 U.S.C. 154(b) by 0 days.

(21) Appl. No.: 17/469,951

(22) Filed: Sep. 9, 2021

(65) Prior Publication Data

US 2022/0074468 A1  Mar. 10, 2022

(30) Foreign Application Priority Data

Sep. 9, 2020 (KR) .......................... 10-2020-0115100

(51) Int. Cl.
*F16H 1/46* (2006.01)

(52) U.S. Cl.
CPC ..................... *F16H 1/46* (2013.01)

(58) Field of Classification Search
CPC ..................................................... F16H 3/666
See application file for complete search history.

(56) References Cited

U.S. PATENT DOCUMENTS 5,240,462 A * 8/1993 Mochizuki ............ F16H 1/2863
475/341
5,409,430 A * 4/1995 Hashimoto ........... F16H 1/2863
475/331

(Continued)

FOREIGN PATENT DOCUMENTS

JP          2015-532969 A    11/2015
KR    10-2013-0090986 A     8/2013
KR         10-1450971 B1     6/2014

OTHER PUBLICATIONS

Korean Office Action dated Jan. 5, 2022 issued in corresponding Korean Patent Application No. 10-2020-0115100.

(Continued)

*Primary Examiner* — Derek D Knight
(74) *Attorney, Agent, or Firm* — Harness, Dickey & Pierce, P.L.C.

(57) ABSTRACT

A planetary gear actuator including a sun gear, a rotary internal gear being concentric with the sun gear, a fixed internal gear being concentric with the sun gear, compound planetary gears, and a carrier connected to each of the compound planetary gears so as to be rotatable relative to each of compound planetary gears may be provided, Each of the compound planetary gears may include a first planet gear engaged with the sun gear, a second planet gear at one side of the first planet gear, engaged with the rotary internal gear, and having a smaller number of teeth than the first planet gear, and a third planet gear at another side of the first planet gear, engaged with the fixed internal gear, and having a smaller number of teeth than the first planet gear. One compound planetary gear may overlap another compound planetary gear in a thickness direction.

15 Claims, 10 Drawing Sheets

(56) References Cited

U.S. PATENT DOCUMENTS

| | | | |
|---|---|---|---|
| 5,472,386 A | 12/1995 | Kish | |
| 6,729,995 B1* | 5/2004 | Bayer | F16H 1/46 |
| | | | 475/331 |
| 2015/0267777 A1* | 9/2015 | Shin | F16H 1/46 |
| | | | 475/332 |

OTHER PUBLICATIONS

Japanese Notice of Allowance dated Aug. 30, 2022 issued in Japanese Patent Application No. 2021-146421.
Korean Notice of Allowance dated Sep. 6, 2022 issued in Korean Patent Application No. 10-2020-0115100.

* cited by examiner

PLANETARY GEAR ACTUATOR

CROSS-REFERENCE TO RELATED APPLICATION

Pursuant to 35 U.S.C. § 119(a), this application claims the benefit of earlier filing date and right of priority to Korean Application No. 10-2020-0115100, filed on Sep. 9, 2020, the contents of which are incorporated herein by reference in its entirety.

BACKGROUND

1. Field

The present disclosure relates to actuators for providing a high reduction gear ratio by using a planetary gear set.

2. Related Art

An actuator is a device for converting, for example, an electric energy into a mechanic driving force, and is an indispensable component of a device, which requires a movement. A power source (a motor, an engine, etc.) of the actuator generates a rotation of a high speed, but generates a low rotary power (e.g., torque). Thus, there is a limitation in implementing a movement of a device desired to be driven, by using merely such a power source.

Due to such reasons, the actuator is generally provided with a speed reducer. The speed reducer is arranged between a power source and a device desired to be driven, and is configured to decrease rpm and to increase a rotary power so as to be suitable for implementation of a movement.

Especially, in case of requiring a very sophisticated operation such as a robot control, a rotation speed outputted from the power source should be reduced with a high reduction gear ratio. Further, the actuator should have a high rotary power, a low frictional force, and a high reverse driving characteristic.

If the actuator does not provide a sufficient reduction gear ratio, processes to reduce a rotation speed through many stages may be required. This may increase a size and complexity of a structure of the actuator. Therefore, there is a need for an actuator which can provide a high reduction gear ratio.

SUMMARY

Therefore, a first aspect of the present disclosure is to provide an actuator capable of obtaining a high reduction gear ratio, a high rotary power, a high efficiency, a low frictional force, and/or a high reverse driving characteristic by improving a planetary gear set.

A second aspect of the present disclosure is to provide a structure capable of implementing the above performances, while reducing a volume of a planetary gear actuator.

A third aspect of the present disclosure is to provide a structure capable of reducing the number of components and a processing cost of a planetary gear actuator.

According to an example embodiment, a planetary gear actuator includes a sun gear, a rotary internal gear being concentric with the sun gear, a fixed internal gear being concentric with the sun gear, a plurality of compound planetary gears each having a first planet gear engaged with the sun gear, a second planet gear at one side of the first planet gear and engaged with the rotary internal gear, and a third planet gear at another side of the first planet gear and engaged with the fixed internal gear, the first to third planet gears integrally coupled onto a same rotation shaft, and a carrier connected to each of the plurality of compound planetary gears so as to be rotatable relative to each of the plurality of compound planetary gears. A part of the first planet gear of one of the plurality of compound planetary gears may overlap the first planet gear of another of the plurality of compound planetary gears in a thickness direction.

A first interval between the second and third planet gears of the one of the plurality of compound planetary gears may be equal to a second interval between the second and third planet gears of the another of the plurality of compound planetary gears, and the first planet gear of the one of the plurality of compound planetary gears and the first planet gear of the another of the plurality of compound planetary gears may cross each other in the first and second intervals.

The second planet gear may be forcibly-fixed to a first extension portion of the first planet gear, and the third planet gear is forcibly-fixed to a second extension portion of the first planet gear. Further, a pin bearing may be inserted into a through hole extended in a thickness direction of the first planet gear, and is arranged in the first and second extension portions, and a coupling unit may rotatably couple the carrier to the pin bearing.

Some effects and/or advantages of the present disclosure that can be obtained through the aforementioned means are as follows.

Firstly, the first planet gear receives a driving force from the sun gear and rotate the plurality of compound planetary gears. The third planet gear engaged with the fixed internal gear makes the plurality of compound planetary gears revolve around the sun gear, and the second planet gear is configured to rotate the rotary internal gear meshed therewith. In the processes, a high reduction gear ratio may be obtained due to a difference in the number of teeth between the sun gear and the first planet gear, a difference in the number of teeth between the fixed internal gear and the third planet gear, and a difference in the number of teeth between the rotary internal gear and the second planet gear.

Secondly, as one first planet gear and another first planet gear adjacent to each other are arranged to cross each other in an overlapped-state in a thickness direction, a volume of the planetary gear actuator may be reduced. When compared with a conventional structure that a planetary gear speed reducer has two stages, the structure of the present disclosure may have a higher reduction gear ratio and a higher rotary power with a smaller volume. Further, when compared with a structure that the compound planetary gears consist of two planetary gears, the structure of the present disclosure may have a lower frictional force, a higher efficiency, and a higher back-drivability. Besides, the structure of the present disclosure may have a higher rotary power, a higher efficiency, and/or a lower frictional force when compared with a harmonic drive gear.

Thirdly, the second and third planet gears are forcibly-fixed to the first planet gear, and the pin bearing is forcibly-fixed to the through hole of the first planet gear. This may reduce the number of components for assembly and rotation of the compound planetary gear, and may reduce a processing cost.

BRIEF DESCRIPTION OF THE DRAWINGS

The above and other features and advantages of example embodiments will become more apparent by describing in detail some example embodiments with reference to the attached drawings. The accompanying drawings are intended to depict some example embodiments of the inventive concepts and should not be interpreted to limit the intended scope of the claims. The accompanying drawings are not to be considered as drawn to scale unless explicitly noted.

DETAILED DESCRIPTION

Figure 1:
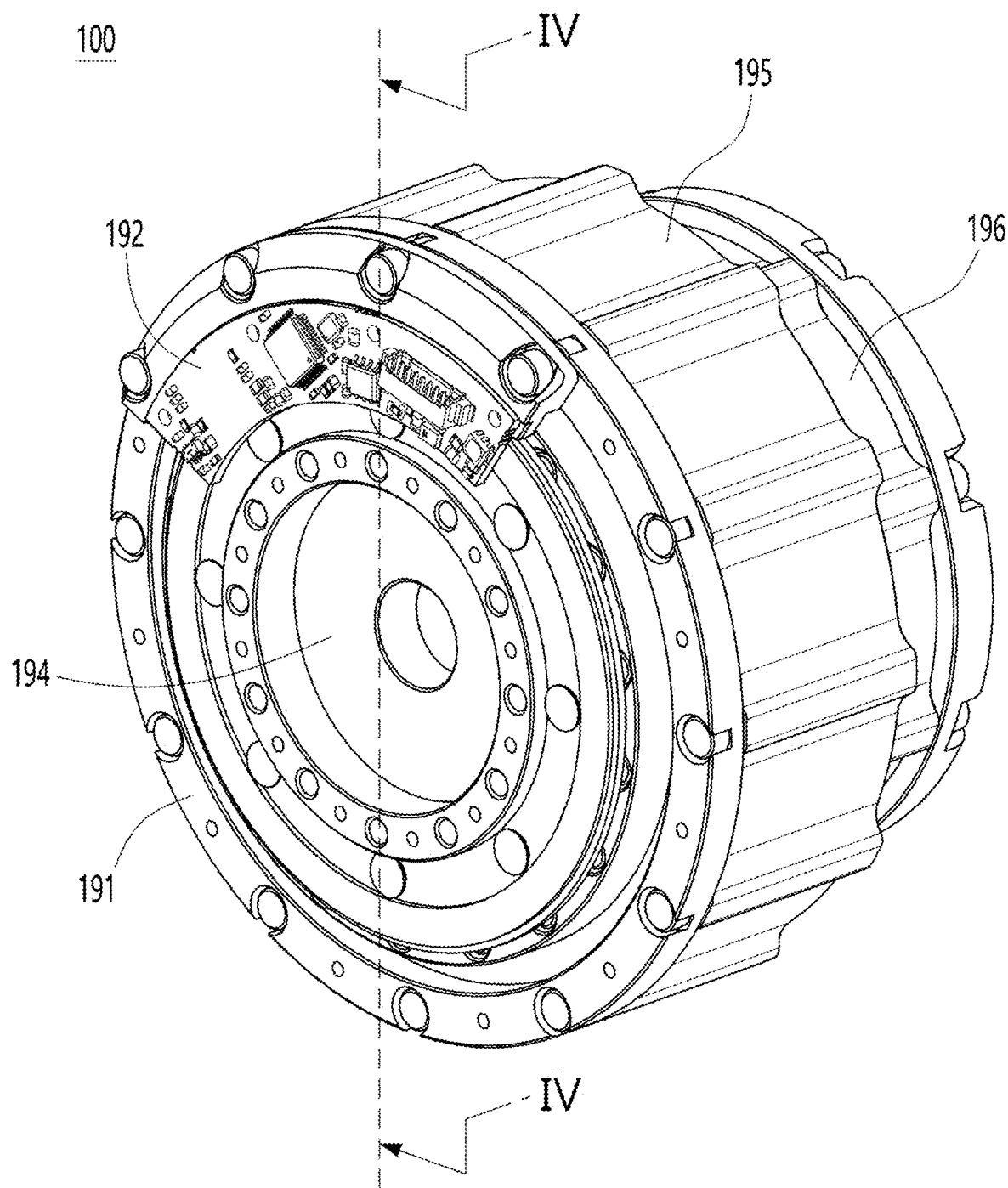
FIG. 1 is a perspective view showing a planetary gear actuator according to an example embodiment of the present disclosure.

Description will now be given in detail according to some example embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the example embodiments presented herein are not limited by the accompanying drawings. As such, the present disclosure should be construed to extend to any alterations, equivalents and substitutes in addition to those that are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

While the term "same," "equal" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Figure 2:
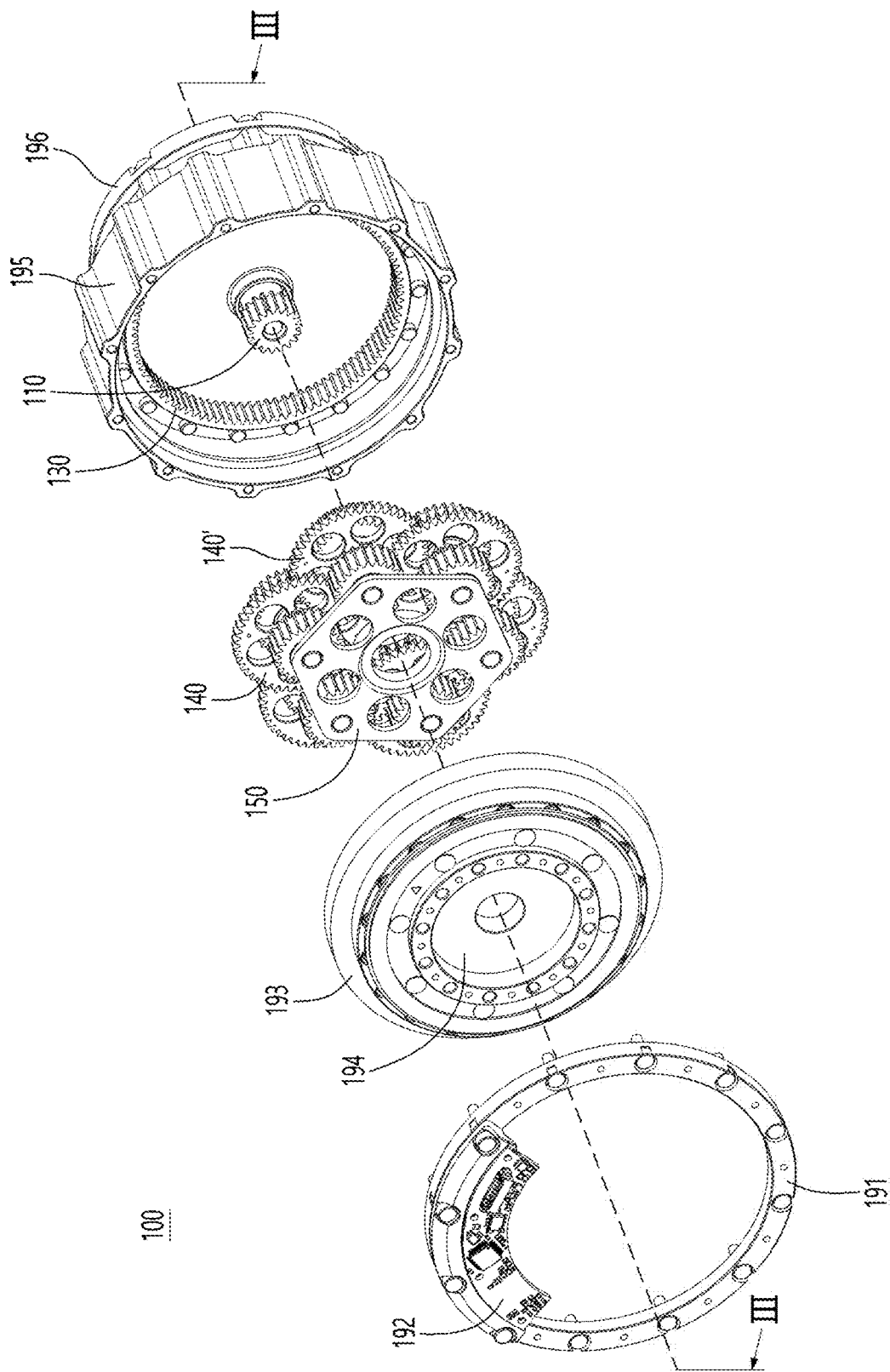
FIG. 2 is a disassembled perspective view of the planetary gear actuator shown in FIG. 1.
Figure 3:
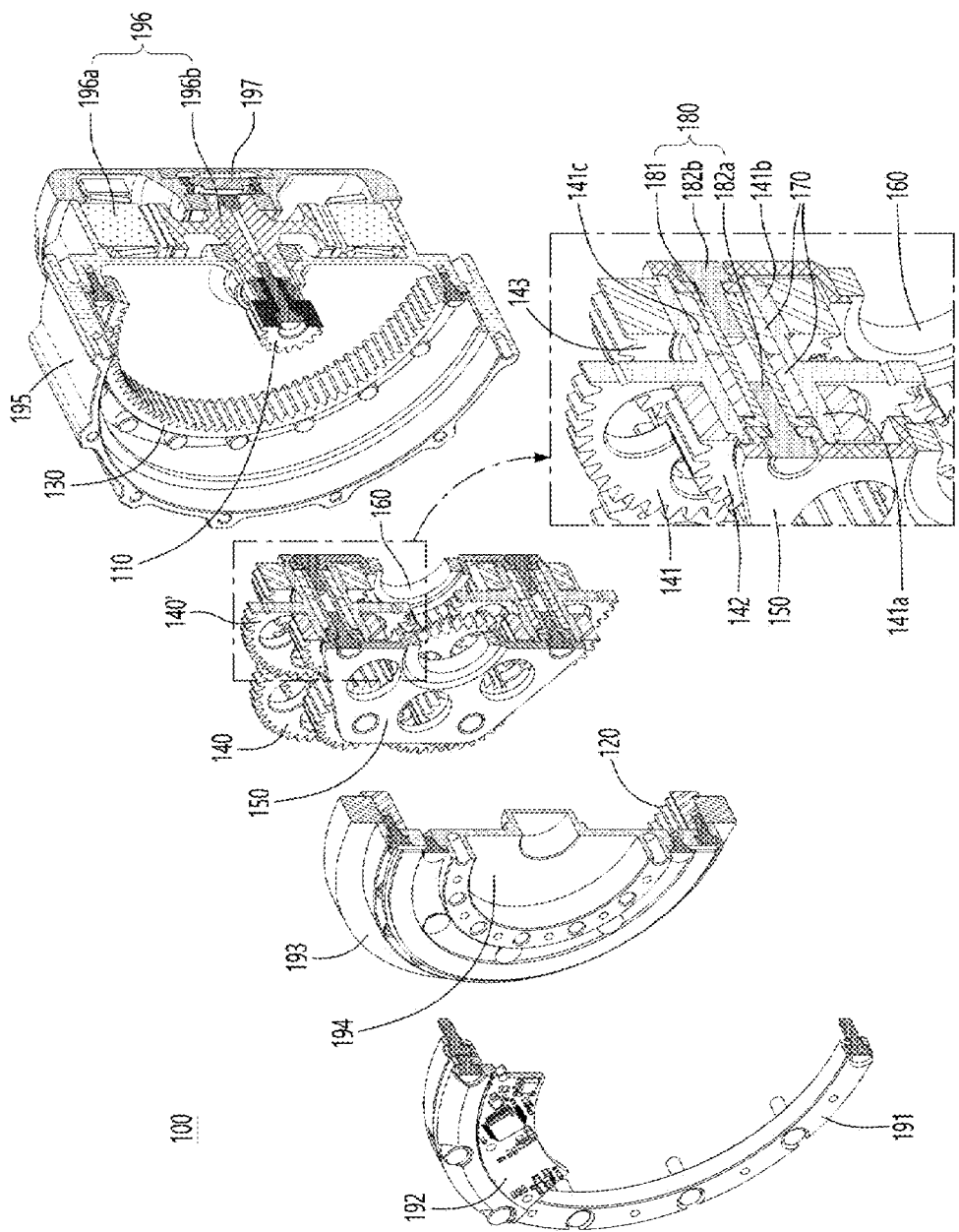
FIG. 3 is a sectional view of the planetary gear actuator shown in FIG. 2, which is taken along line ' III-III'.
Figure 4:
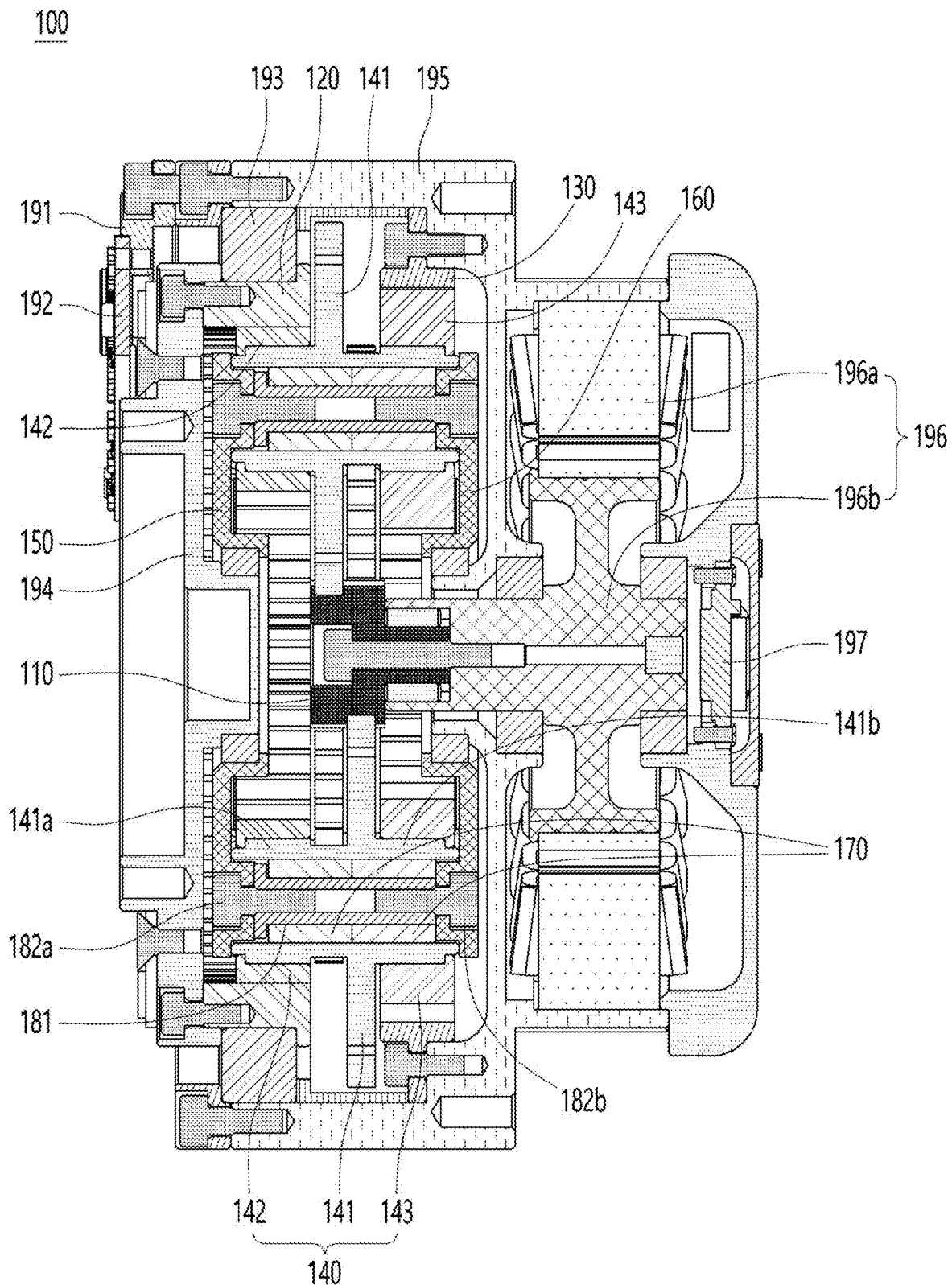
FIG. 4 is a sectional view of the planetary gear actuator shown in FIG. 1, which is taken along line 'IV-IV'.

FIG. 1 is a perspective view showing a planetary gear actuator 100 according to an example embodiment of the present disclosure. FIG. 2 is a disassembled perspective view of the planetary gear actuator 100 shown in FIG. 1. FIG. 3 is a sectional view of the planetary gear actuator 100 shown in FIG. 2, which is taken along line 'III-III'. FIG. 4 is a sectional view of the planetary gear actuator 100 shown in FIG. 1, which is taken along line 'IV-IV'.

Referring to FIGS. 1 to 4, the planetary gear actuator 100 includes a motor 196 serving as a power source, and a planetary gear set serving as a speed reducer. The planetary gear set is arranged between the motor 196 and a device to be driven (e.g., an arm of a robot, a leg, etc.), and is configured to decrease rpm to increase a rotary power so as to be suitable for implementation of a movement.

The planetary gear set includes a sun gear 110 (S), a rotary internal gear 120 (R1), a fixed internal gear 130 (R2), a plurality of compound planetary gears 140, and carriers 150, 160, 180. The compound planetary gears 140 each include a first planet gear 141 (P1) meshed (e.g., engaged) with the sun gear 110, a second planet gear 142 (P2) meshed with the rotary internal gear 120, and a third planet gear 143 (P3) meshed with the fixed internal gear 130. A detailed structure of the planetary gear set will be explained later.

The planetary gear actuator 100 further includes a ring frame 191, a cross roller bearing 193, an output frame 194, and a housing 195.

The ring frame 191 and the housing 195 are coupled to each other to thus form an appearance of the planetary gear actuator 100, and are configured to accommodate the planetary gear set and the motor 196 therein.

The output frame 194 is coupled to the rotary internal gear 120, and is rotated together when the rotary internal gear 120 rotates. That is, the output frame 194 is a part to which a rotary power generated from the planetary gear actuator 100 is finally transmitted. The output frame 194 is configured to transmit the rotary power by being connected to a device to be driven.

The cross roller bearing 193 configured to rotatably support the output frame 194 is arranged between the output frame 194 and the housing 195.

Under the above structure, the output frame 194 is formed to be relatively rotatable with respect to the ring frame 191 having a fixed position.

A first encoder 192 configured to sense a rotation of the output frame 194 may be mounted to the ring frame 191. The first encoder 192 may be an absolute encoder that can measure an absolute position value regardless of a power supply state.

The motor 196 is provided with a stator 196*a* and a rotor 196*b*, and is configured to generate a driving force.

A second encoder 197 configured to sense a rotation of the motor 196 may be mounted to an inner side surface of the housing 195 adjacent to the motor 196. The second encoder 197 may be formed as an incremental encoder that can measure a relative position from a basic point.

Hereinafter, the planetary gear set serving as a speed reducer will be explained in more detail.

Figure 5:
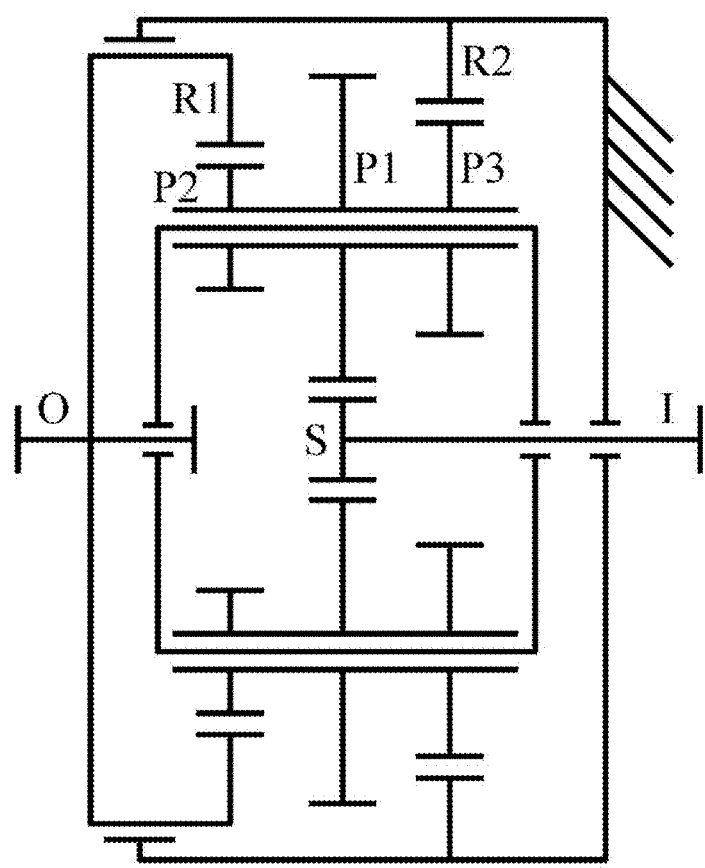
FIG. 5 is a stick diagram showing a planetary gear set shown in FIG. 4.
Figure 6A:
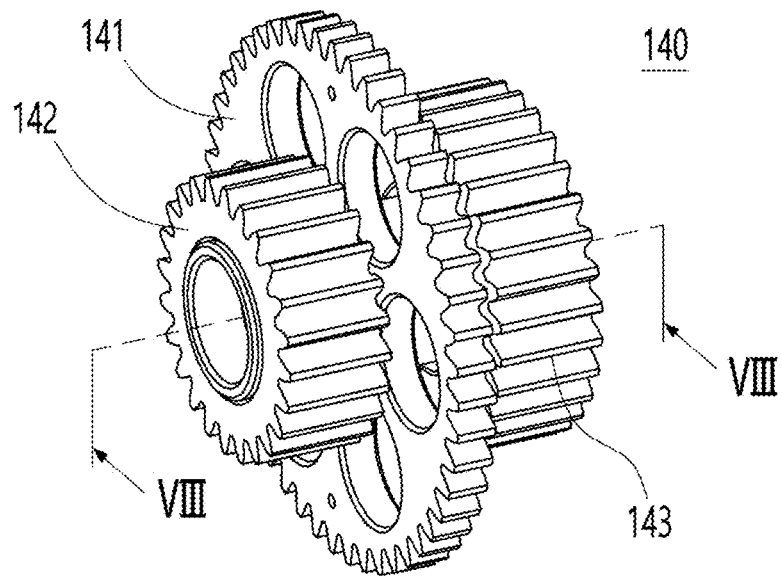
FIGS. 6A, 6B, 6C are conceptual views of a compound planetary gear shown in FIG. 2.
Figure 6B:
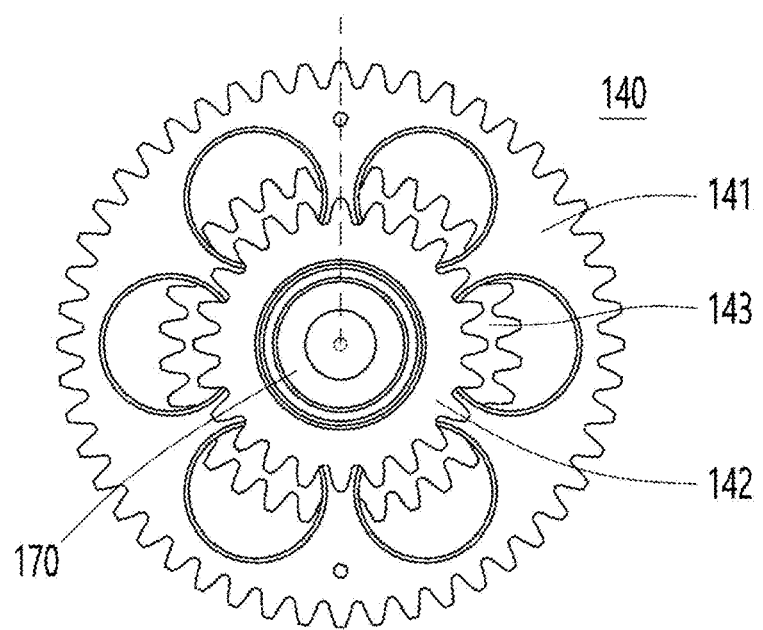

FIG. 5 is a stick diagram showing the planetary gear set shown in FIG. 4, and FIGS. 6A and 6B are conceptual views of the compound planetary gear 140 shown in FIG. 2.

Figure 6C:
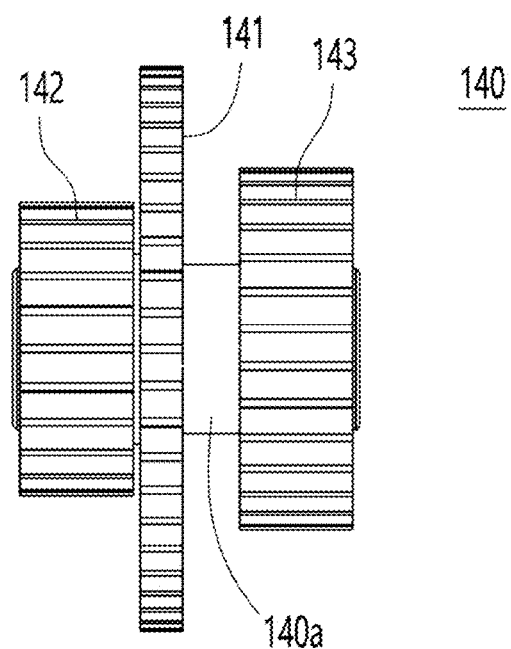

Referring to FIGS. 5 and 6, the planetary gear set includes a sun gear 110, a rotary internal gear 120, a fixed internal gear 130, a plurality of compound planetary gears 140, and carriers 150, 160, 180.

In this example embodiment, shown is a structure that the carriers 150, 160, 180 include a first carrier frame 150 arranged at one side of the plurality of compound planetary gears 140, a second carrier frame 160 arranged at another side of the plurality of compound planetary gears 140, and a coupling unit 180 connected to the first carrier frame 150 and the second carrier frame 160 through each of the plurality of compound planetary gears 140.

The sun gear 110 is connected to the rotor 196*b*, and is formed to transmit a driving force generated from the motor 196 to the compound planetary gears 140. The sun gear 110 is formed to be meshed with the first planet gear 141 of the compound planetary gears 140 through the carrier (the second carrier frame 160 in the drawings).

The rotary internal gear 120 is arranged to be concentric with the sun gear 110. A rotation center of the rotary internal gear 120 is consistent with a rotation center of the sun gear 110. The rotary internal gear 120 has an inner diameter smaller than that of the fixed internal gear 130, and has a smaller number of teeth than the fixed internal gear 130.

The fixed internal gear 130 is arranged to be concentric with the sun gear 110. A rotation center of the fixed internal gear 130 is consistent with the rotation center of the sun gear 110. The fixed internal gear 130 is arranged to face the rotary internal gear 120 in a thickness direction of the planetary gear set. In this example embodiment, the first planet gear 141 is arranged between the fixed internal gear 130 and the rotary internal gear 120. Under the arrangement structure and an arrangement structure to be later explained that neighboring first planet gears 141, 141' are arranged to cross each other in a partially-overlapped state, the first planet gear 141 may have a maximum diameter and the maximum number of teeth within a desired (or alternatively, preset space).

The compound planetary gears 140 includes a first planet gear 141, a second planet gear 142 and a third planet gear 143. The first to third planet gears 141, 142, 143 are formed to rotate together by being integrally coupled onto the same rotation shaft.

In this example embodiment, the number of the compound planetary gears 140 is 6, and the compound planetary gears 140 are arranged at desired (or alternatively, predetermined) angles (60° in the drawings) on the basis of the center of the sun gear 110, at a position that a rotation shaft of each of the compound planetary gears 140 is spaced from the center of the sun gear 110 in a radius direction by a desired (or alternatively, predetermined) distance.

The first planet gear 141 is formed to be meshed with the sun gear 110. The first planet gear 141 has a larger diameter and a larger number of teeth than the second and third planet gears 142,143.

The second planet gear 142 is formed at one side of the first planet gear 141, and is meshed (e.g., engaged) with the rotary internal gear 120. In this example embodiment, the second planet gear 142 has a smaller diameter and a smaller number of teeth than the third planet gear 143.

The third planet gear 143 is formed at another side of the first planet gear 141, and is meshed (e.g., engaged) with the fixed internal gear 130.

The first carrier frame 150 is arranged at one side of the compound planetary gears 140, and is connected to the plurality of compound planetary gears 140 such that the first carrier frame 150 rotates relative to the plurality of compound planetary gears 140. That is, the rotation shaft of each of the plurality of compound planetary gears 140 is rotatably connected to the first carrier frame 150.

The second carrier frame 160 is arranged at another side of the compound planetary gears 140, and is connected to the plurality of compound planetary gears 140 such that the second carrier frame 160 rotates relative to the plurality of compound planetary gears 140. That is, the rotation shaft of each of the plurality of compound planetary gears 140 is rotatably connected to the second carrier frame 160. An opening through which the sun gear 110 or the rotor 196*b* passes is formed at a middle part of the second carrier frame 160.

Under the above structure, the planetary gear set is driven as follows.

Once the motor 196 is driven, the sun gear 110 is rotated by a driving force generated from the motor 196. The sun gear 110 transmits the driving force to the first planet gear 141 meshed therewith. Hereinafter, a case where the sun gear 110 is rotated clockwise will be explained as an example.

The first planet gear 141 receives a rotary power from the sun gear 110, thereby rotating the plurality of compound planetary gears 140. In the aforementioned example embodiment, the plurality of compound planetary gears 140 are rotated counterclockwise.

Here, the third planet gear 143 meshed with the fixed internal gear 130 makes the plurality of compound planetary gears 140 revolve around the sun gear 110. In the aforementioned example embodiment, the plurality of compound planetary gears 140 revolve clockwise.

As the plurality of compound planetary gears 140 rotate and revolve, the second planet gear 142 is configured to rotate the rotary internal gear 120 meshed therewith. In the aforementioned example embodiment, the rotary internal gear 120 is rotated clockwise.

In the aforementioned processes, a high reduction gear ratio is obtained due to a teeth difference between the sun gear 110 and the first planet gear 141, a teeth difference between the fixed internal gear 130 and the third planet gear 143, and a teeth difference between the rotary internal gear 120 and the second planet gear 142.

The reduction gear ratio means an output speed (e.g., a rotation speed of the rotary internal gear 120) with respect to an input speed (e.g., a rotation speed of the sun gear 110) and is calculated as (P1/S+P3/R2)/(P3/R2−P2/R1). For reference, in the above calculation formula of the reduction gear ratio, S denotes the number of teeth of the sun gear 110, R1 denotes the number of teeth of the rotary internal gear 120, R2 denotes the number of teeth of the fixed internal gear 130, P1 denotes the number of teeth of the first planet gear 141, P2 denotes the number of teeth of the second planet gear 142, and P3 denotes the number of teeth of the third planet gear 143.

For reference, a ratio (Px/Ry) of the number of teeth of the planetary gears 142, 143 meshed with the internal gears 120, 130, with respect to the number of teeth of the internal gears 120, 130 is higher as a diameter of the internal gears (proportional to the number of teeth) is large.

Thus, similar to the aforementioned structure, in a case that the rotary internal gear 120 has a smaller diameter and a smaller number of teeth than the fixed internal gear 130, and in a case that the second planet gear 142 has a smaller diameter and a smaller number of teeth than the third planet gear 143, P3/R2 is always higher than P2/R1. As a result, the reduction gear ratio is always a positive number. That is, the rotary internal gear 120 is rotated in the same direction as the sun gear 110.

However, example embodiments of the present disclosure are not limited to this. The rotary internal gear 120 may have a larger diameter and a larger number of teeth than the fixed internal gear 130, and the second planet gear 142 may have a larger diameter and a larger number of teeth than the third planet gear 143. In this case, P3/R2 is always lower than P2/R1. As a result, the reduction gear ratio is always a negative number. That is, the rotary internal gear 120 is rotated in an opposite direction to the sun gear 110.

Hereinafter, will be explained a structure capable of reducing a volume of the planetary gear actuator 100 with implementing the above performance.

Figure 7A:
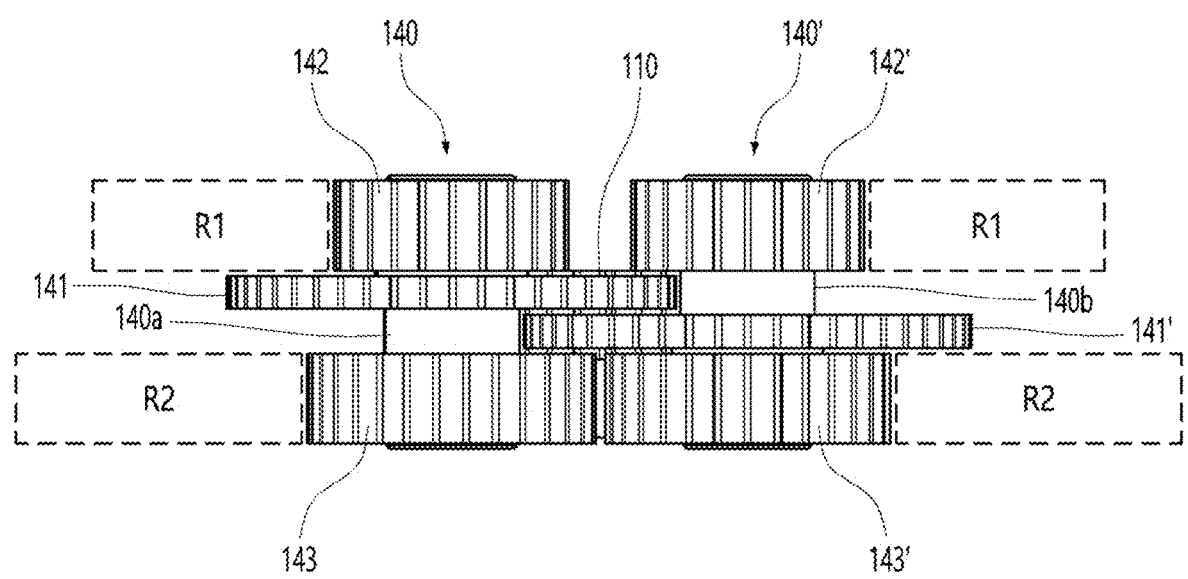
FIGS. 7A and 7B are conceptual views showing an arrangement relation between two neighboring compound planetary gears and a sun gear shown in FIG. 2.
Figure 7B:
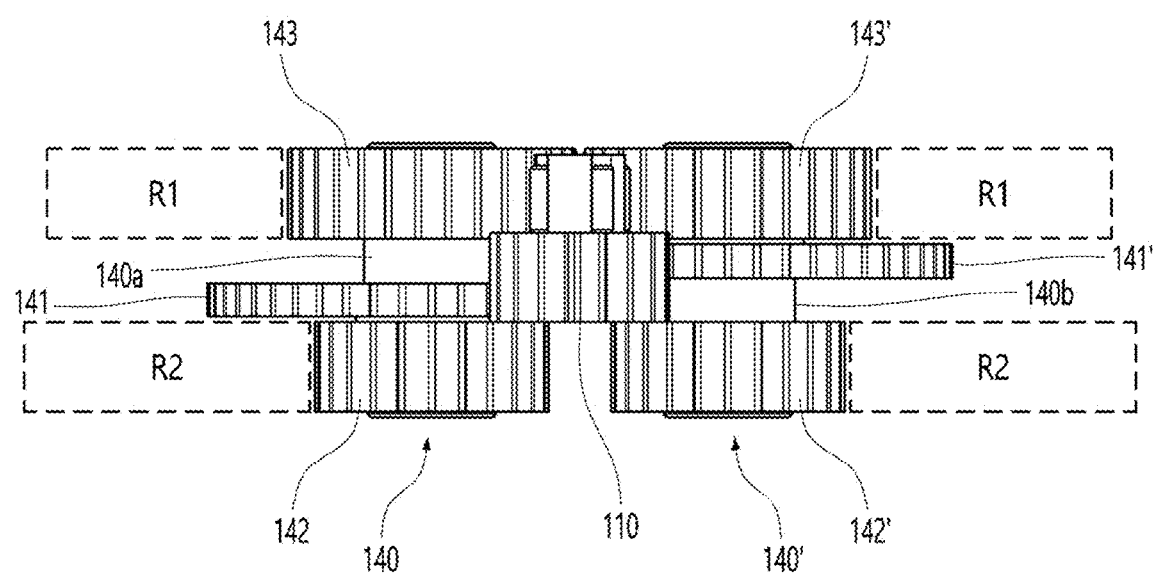

FIGS. 7A and 7B are conceptual views showing an arrangement between two neighboring compound planetary gears 140, 140' and the sun gear 110 shown in FIG. 2. For reference, in FIG. 7A, the sun gear 110 is considerably blocked by the two compound planetary gears 140, 140'. FIG. 7B is a drawing viewed from the opposite direction to FIG. 7A, in which the sun gear 110 covers a part of the two compound planetary gears 140, 140'.

Referring to FIG. 7A in conjunction with FIGS. 2 and 3, one compound planetary gear 140 is arranged to overlap another neighboring compound planetary gear 140' in a thickness direction. That is, as one compound planetary gear 140 is arranged to cross another neighboring compound planetary gear 140', the planetary gear actuator 100 may have a compact configuration.

For example, the first planet gear 141 provided at one compound planetary gear 140 is arranged to overlap first planet gear 141' provided at another compound planetary gear 140' in a thickness direction.

An interval between the second and third planet gears 142, 143 provided at one compound planetary gear 140 is formed to be equal to an interval between second and third planet gears 142', 143' provided at another compound planetary gear 140'.

Here, the first planet gear 141 provided at one compound planetary gear 140, and the first planet gear 141' provided at another compound planetary gear 140' are arranged to cross each other in the interval in a state that they partially overlap each other.

For the structure, the first planet gear 141 provided at one compound planetary gear 140 is spaced from the third planet gear 143 by a desired (or alternatively, predetermined) interval, thereby defining a first separation part 140a between the first planet gear 141 and the third planet gear 143. On the other hand, the first planet gear 141' provided at another compound planetary gear 140' is spaced from the second planet gear 142' by a desired (or alternatively, predetermined) interval, thereby defining a second separation part 140b between the first planet gear 141' and the second planet gear 142'.

In the aforementioned structure, a part of the first planet gear 141 provided at one compound planetary gear 140 is arranged in the second separation part 140b, and a part of the first planet gear 141' provided at another compound planetary gear 140' is arranged in the first separation part 140a.

This may implement a structure capable of enhancing a reduction gear ratio by increasing a diameter and the number of teeth of the first planet gear 141, without an interference between the two neighboring compound planetary gears 140, 140'.

When compared with a structure that a planetary gear speed reducer is laminated with two stages, the structure of the present disclosure may have a higher reduction gear ratio and a higher rotary power with a smaller volume. Further, when compared with a structure that the compound planetary gears 140 consist of two planetary gears, the structure of the present disclosure may have a lower frictional force, a higher efficiency, and a higher back-drivability. Besides, the structure of the present disclosure may have a higher rotary power, a higher efficiency, and a lower frictional force when compared with a harmonic drive gear.

Meanwhile, the first planet gear 141 provided at one compound planetary gear 140 may be arranged to overlap at least one of the second and third planet gears 142', 143' provided at another compound planetary gear 140' in a thickness direction. In this example embodiment, it is shown that the first planet gear 141 provided at one compound planetary gear 140 is arranged to overlap all of the first to third planet gears 141', 142', 143' provided at another compound planetary gear 140' in a thickness direction.

Referring to FIGS. 7A and 7B, the sun gear 110 is meshed (e.g. engaged) with the first planet gear 141 of each compound planetary gear 140, so as to transmit a driving force. As the two neighboring first planet gears 141, 141' are arranged to cross each other, the sun gear 110 is arranged to overlap the first planet gear 141 provided at one compound planetary gear 140 and the first planet gear 141' provided at another compound planetary gear 140' in a radius direction.

A tooth thickness of the sun gear 110 is formed to be greater than a sum between a tooth thickness of the first planet gear 141 provided at one compound planetary gear 140 and a tooth thickness of the first planet gear 141' provided at another compound planetary gear 140'.

Hereinafter, will be explained a structure capable of reducing the number of components and a processing cost of the planetary gear actuator 100.

Figure 8:
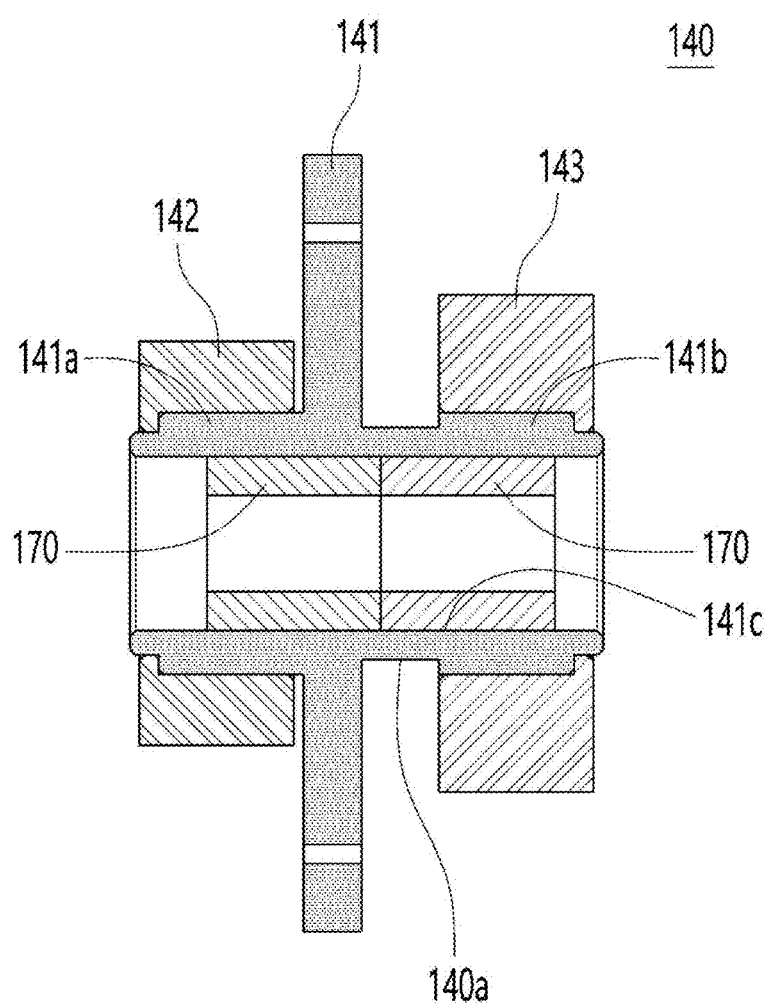
FIG. 8 is a sectional view of the compound planetary gear shown in FIG. 6A, which is taken along line VIII-VIII'.

FIG. 8 is a sectional view of the compound planetary gear 140 shown in FIG. 6(a), which is taken along line VIII-VIII'.

Referring to FIG. 8, the first to third planet gears 141, 142, 143 are integrally coupled onto the same rotation shaft. For this, the first planet gear 141 includes a first extension portion 141a and a second extension portion 141b.

The first extension portion 141a is extended to one side of the first planet gear 141, to thus be coupled to the second planet gear 142. The second planet gear 142 may be forcibly-fixed to the first extension portion 141a.

A guide protrusion may be extendedly-formed at an outer circumference of the first extension portion 141a in a rotation shaft direction, and a guide groove inserted into the guide protrusion to thus be inserted into the first extension portion 141a may be formed at an inner circumference of the second planet gear 142. The positions of the guide protrusion and the guide groove may be switched from each other.

Further, a stopper (not shown) for limiting an insertion amount of the second planet gear 142 may be provided at the first extension portion 141a.

The second extension portion 141b is extended to another side of the first planet gear 141, to thus be coupled to the third planet gear 143. The third planet gear 143 may be forcibly-fixed to the second extension portion 141b.

A guide protrusion may be extendedly-formed at an outer circumference of the second extension portion 141b in a rotation shaft direction, and a guide groove inserted into the guide protrusion to thus be inserted into the second extension portion 141b may be formed at an inner circumference of the third planet gear 143. The positions of the guide protrusion and the guide groove may be switched from each other.

Further, a stopper (not shown) for limiting an insertion amount of the third planet gear 143 may be provided at the second extension portion 141b.

Each of the second and third planet gears 142, 143 is aligned to have its tooth end consistent with a tooth end of the first planet gear 141. For this, the aforementioned guide protrusion and guide groove may be formed at preset positions to guide the alignment.

Meanwhile, a through hole 141c that passes through the center of the first planet gear 141 in a thickness direction is extendedly-formed at the first planet gear 141. The through hole 141c is formed to pass through the first and second extension portions 141a, 141b.

A pin bearing 170 is inserted into the through hole 141c. The pin bearing 170 is inserted into the through hole 141c to thus be arranged in the first and second extension portions 141a, 141b.

A first carrier frame 150 and a second carrier frame 160 are rotatably coupled to the pin bearing 170 through a coupling unit 180. In this example embodiment, the coupling unit 180 includes a shaft 181, a first coupling pin 182a, and a second coupling pin 182b. The shaft 181 is inserted into the pin bearing 170. The first coupling pin 182a is inserted into the shaft 181 through the first carrier frame 150, and the second coupling pin 182b is inserted into the shaft 181 through the second carrier frame 160.

Under the aforementioned structure, the second and third planet gears 142, 143 are forcibly-fixed to the first planet gear 141, and the pin bearing 170 is forcibly-fixed to the through hole 141c of the first planet gear 141. This may reduce the number of components for assembly and rotation of the compound planetary gear 140, and may reduce a processing cost.

Hereinafter, one design example of the planetary gear set shown in FIG. 1 will be explained with reference to FIG. 9.

Figure 9:
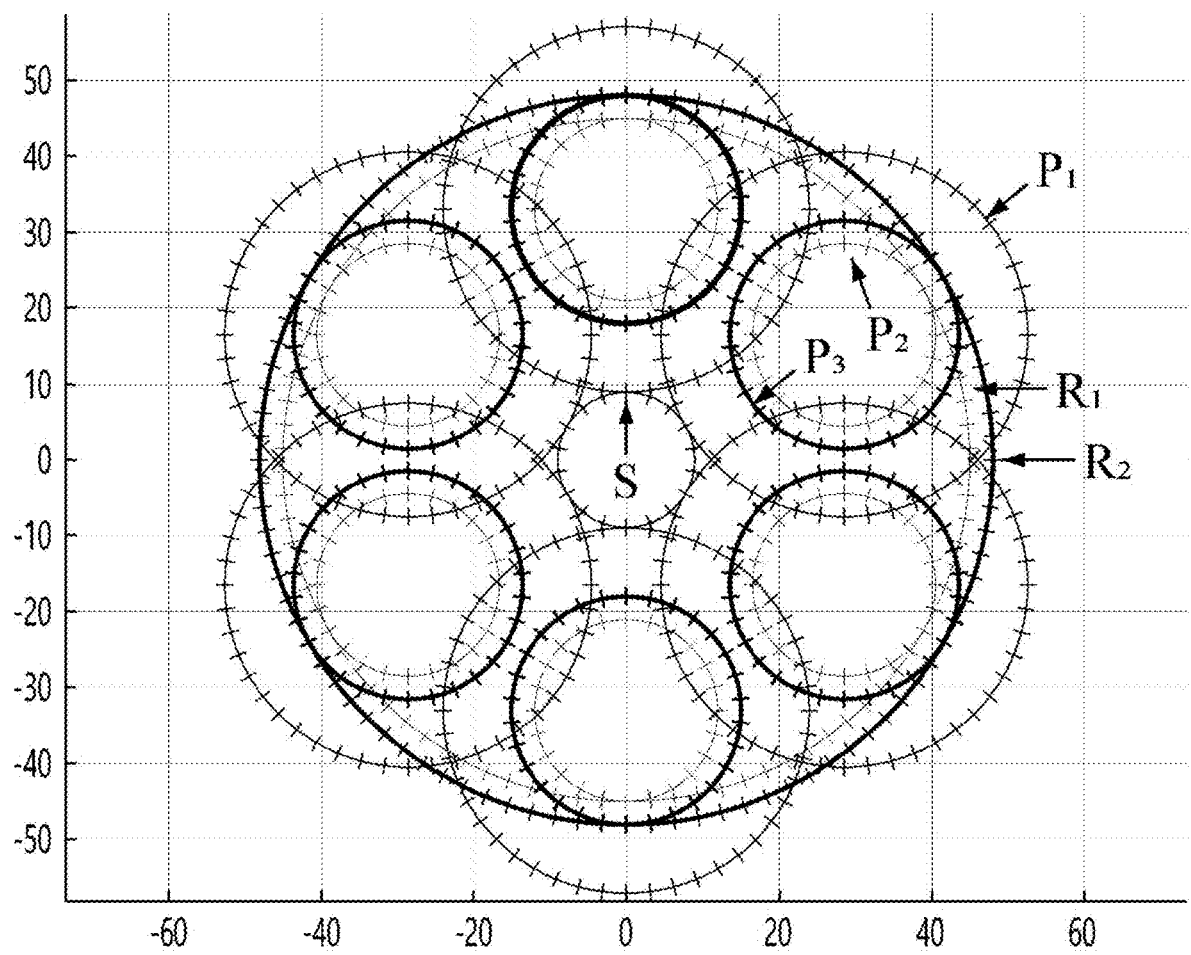
FIG. 9 is a conceptual view showing one design example of the planetary gear set shown in FIG. 1.

Referring to FIG. 9, the sun gear 110 has 18 gear teeth (S=18), the rotary internal gear 120 has 90 gear teeth (R1=90), and the fixed internal gear 130 has 96 gear teeth (R2=96). Further, the first planet gear 141 provided at the compound planetary gear 140 has 48 gear teeth (P1=48), the second planet gear 142 has 24 gear teeth (P2=24), and the third planet gear 143 has 30 gear teeth (P3=30). Here, a diameter of each gear is proportional to the teeth number.

A reduction gear ratio is calculated as (P1/S+P3/R2)/(P3/R2−P2/R1). According to the calculation, a reduction gear ratio of the aforementioned planetary gear set is 65. That is, a speed reduction to 65:1 can be obtained if the planetary gear set is used.

The foregoing example embodiments are merely exemplary and are not to be construed as limiting the present disclosure. The scope of the present disclosure should be determined by reasonable interpretations of the appended claims, and all changes and modifications that fall within the metes and bounds of the claims, or equivalents of such metes and bounds are therefore intended to be embraced by the appended claims.

What is claimed is:

1. A planetary gear actuator, comprising:
a sun gear;
a rotary internal gear being concentric with the sun gear;
a fixed internal gear being concentric with the sun gear;
a plurality of compound planetary gears; and
a carrier connected to each of the plurality of compound planetary gears so as to be rotatable relative to each of the plurality of compound planetary gears,
wherein each of the plurality of compound planetary gears includes,
a first planet gear engaged with the sun gear,
a second planet gear at one side of the first planet gear, the second planet gear engaged with the rotary internal gear and having a smaller number of teeth than the first planet gear, and
a third planet gear at another side of the first planet gear, the third planet gear engaged with the fixed internal gear and having a smaller number of teeth than the first planet gear,
wherein the first planet gear of the one of the plurality of compound planetary gears overlaps the first planet gear of another of the plurality of compound planetary gears in a thickness direction,
the first planet gear of the one of the plurality of compound planetary gears is spaced from the third planet gear of the one of the plurality of compound planetary gears by a first interval such that a first separation part is defined therebetween, and
the first planet gear of the another of the plurality of compound planetary gears is spaced from the second planet gear of the another of the plurality of compound planetary gears by a second interval such that a second separation part is defined therebetween.

2. The planetary gear actuator of claim 1, wherein
a part of the first planet gear of the one of the plurality of compound planetary gears is in the second separation part, and
a part of the first planet gear of the another of the plurality of compound planetary gears is in the first separation part.

3. The planetary gear actuator of claim 1, wherein the first planet gear of the one of the plurality of compound planetary gears overlaps at least one of the second planet gear or the third planet gear of the another of the plurality of compound planetary gears in a thickness direction.

4. The planetary gear actuator of claim 1, wherein a part of the first planet gear is between the fixed internal gear and the rotary internal gear.

5. The planetary gear actuator of claim 1, wherein the sun gear overlaps the first planet gear of the one of the plurality of compound planetary gears and the first planet gear the another of the plurality of compound planetary gears in a radius direction.

6. The planetary gear actuator of claim 1, wherein
the rotary internal gear has a smaller number of teeth than the fixed internal gear, and
the second planet gear has a smaller number of teeth than the third planet gear.

7. The planetary gear actuator of claim 1, wherein
the rotary internal gear has a larger number of teeth than the fixed internal gear, and
the second planet gear has a larger number of teeth than the third planet gear.

8. The planetary gear actuator of claim 1, wherein
the first planet gear includes,
a first extension portion extending to one side of the first planet gear and coupled to the second planet gear, and
a second extension portion extending to another side of the first planet gear and coupled to the third planet gear, and
a tooth end of each of the second and third planet gears is consistent with a tooth end of the first planet gear.

9. The planetary gear actuator of claim 8, wherein
the first planet gear includes a through hole extending in a thickness direction thereof and through the first and second extension portions, and
the planetary gear actuator further includes,
a pin bearing inserted into the through hole, and
a coupling unit configured to rotatably couple the carrier to the pin bearing.

10. A planetary gear actuator, comprising:
a sun gear;
a rotary internal gear being concentric with the sun gear;
a fixed internal gear being concentric with the sun gear;
a plurality of compound planetary gears each having a first planet gear engaged with the sun gear, a second planet gear at one side of the first planet gear and engaged with the rotary internal gear, and a third planet gear at another side of the first planet gear and engaged with the fixed internal gear, the first to third planet gears integrally coupled onto a same rotation shaft; and
a carrier connected to each of the plurality of compound planetary gears so as to be rotatable relative to each of the plurality of compound planetary gears,
wherein a part of the first planet gear of one of the plurality of compound planetary gears overlaps the first planet gear of another of the plurality of compound planetary gears in a thickness direction,
the first planet gear of the one of the plurality of compound planetary gears is spaced from the third planet gear of the one of the plurality of compound planetary gears by a first interval such that a first separation part is defined therebetween, and
the first planet gear of the another of the plurality of compound planetary gears is spaced from the second planet gear of the another of the plurality of compound planetary gears by a second interval such that a second separation part is defined therebetween.

11. The planetary gear actuator of claim 10, wherein
a first interval is equal to a second interval be, and
the first planet gear of the one of the plurality of compound planetary gears and the first planet gear of the another of the plurality of compound planetary gears cross each other in the first and second intervals.

12. The planetary gear actuator of claim 10, wherein a part of the first planet gear of the one of the plurality of compound planetary gears overlaps at least one of the second and third planet gears of the another of the plurality of compound planetary gears in a thickness direction.

13. The planetary gear actuator of claim 10, wherein the sun gear overlaps the first planet gear of the one of the plurality of compound planetary gears and the first planet gear of the another of the plurality of compound planetary gears in a radius direction.

14. The planetary gear actuator of claim 10, wherein
the rotary internal gear has a smaller number of teeth than the fixed internal gear, and
the second planet gear has a smaller number of teeth than the third planet gear.

15. The planetary gear actuator of claim 10, wherein
the rotary internal gear has a larger number of teeth than the fixed internal gear, and
the second planet gear has a larger number of teeth than the third planet gear.

* * * * *

UNITED STATES PATENT AND TRADEMARK OFFICE
CERTIFICATE OF CORRECTION

| | |
|---|---|
| PATENT NO. | : 11,703,109 B2 |
| APPLICATION NO. | : 17/469951 |
| DATED | : July 18, 2023 |
| INVENTOR(S) | : Yong Jae Kim et al. |

Page 1 of 1

It is certified that error appears in the above-identified patent and that said Letters Patent is hereby corrected as shown below:

On the Title Page

At item (73):
Assignee: "NAVER LABS CORPORATION", Gyeonggi-do (KR)" and "KOREA UNIVERSITY OF TECHNOLOGY AND EDUCATION INDUCTRY-UNIVERSITY COOPERATION FOUNDATION, Chungcheongnam-do (KR)"

Should read:
Assignee: --NAVER LABS CORPORATION, Gyeonggi-do (KR) and KOREA UNIVERSITY OF TECHNOLOGY AND EDUCATION INDUSTRY- UNIVERSITY COOPERATION FOUNDATION, Chungcheongnam-do (KR)--

Signed and Sealed this
Twenty-third Day of January, 2024

Katherine Kelly Vidal
*Director of the United States Patent and Trademark Office*